(12) United States Patent
Gou et al.

(10) Patent No.: US 12,457,062 B2
(45) Date of Patent: Oct. 28, 2025

(54) CODEBOOK DESIGN FOR MULTIMEDIA BROADCAST MULTICAST SERVICES (MBMS)

(71) Applicant: ZTE Corporation, Guangdong (CN)

(72) Inventors: Wei Gou, Guangdong (CN); Peng Hao, Guangdong (CN); Jing Shi, Guangdong (CN); Wei Chen, Guangdong (CN)

(73) Assignee: ZTE Corporation, Shenzhen Guangdong (CN)

( * ) Notice: Subject to any disclaimer, the term of this patent is extended or adjusted under 35 U.S.C. 154(b) by 172 days.

(21) Appl. No.: 18/165,115

(22) Filed: Feb. 6, 2023

(65) Prior Publication Data
US 2023/0179346 A1    Jun. 8, 2023

Related U.S. Application Data

(63) Continuation of application No. PCT/CN2020/107653, filed on Aug. 7, 2020.

(51) Int. Cl.
*H04L 1/1829* (2023.01)
*H04L 5/00* (2006.01)

(52) U.S. Cl.
CPC .......... *H04L 1/1854* (2013.01); *H04L 1/1861* (2013.01); *H04L 5/0055* (2013.01)

(58) Field of Classification Search
CPC .... H04L 1/1854; H04L 1/1861; H04L 5/0055
See application file for complete search history.

(56) References Cited

U.S. PATENT DOCUMENTS

| | | | |
|---|---|---|---|
| 2013/0315124 A1 | 11/2013 | Rapaport et al. | |
| 2019/0132104 A1 | 5/2019 | Lee et al. | |
| 2020/0106566 A1 | 4/2020 | Yeo et al. | |
| 2020/0213981 A1 | 7/2020 | Park et al. | |
| 2021/0021381 A1* | 1/2021 | Saber | H04L 1/1896 |

(Continued)

FOREIGN PATENT DOCUMENTS

| | | |
|---|---|---|
| CN | 101924606 | 12/2010 |
| JP | 2023/532692 A | 7/2023 |

(Continued)

OTHER PUBLICATIONS

3GPP TS 38.213 version 15.5.0 Release 15, "5G;NR; Physical layer procedures for control" (Year: 2019).*

(Continued)

*Primary Examiner* — Mark D Featherstone
*Assistant Examiner* — Rong Tang
(74) *Attorney, Agent, or Firm* — Perkins Coie LLP (57) ABSTRACT

The present application relates to methods, systems, and devices related to digital wireless communication, and more specifically, to techniques related to determining PUCCH resources for a HARQ-ACK codebook of a MBMS service. In one exemplary aspect, a method for wireless communication is disclosed. The method includes receiving, by a terminal, a first set of information relating to a unicast service and a second set of information relating to a multimedia broadcast multicast service (MBMS). The method also includes generating, by the terminal, a final codebook that is a concatenation of a first codebook based on the first set of information and a second codebook based on the second set of information.

14 Claims, 6 Drawing Sheets

(56) References Cited

U.S. PATENT DOCUMENTS

| | | | |
|---|---|---|---|
| 2022/0209901 A1* | 6/2022 | Lei | H04L 1/1896 |
| 2022/0311556 A1* | 9/2022 | Singh | H04L 1/1854 |
| 2023/0327838 A1* | 10/2023 | Fan | H04L 1/1812 |
| | | | 370/329 |

FOREIGN PATENT DOCUMENTS

| | | |
|---|---|---|
| WO | 2019/192715 | 10/2019 |
| WO | 2019/216620 | 11/2019 |
| WO | 2020/122687 | 6/2020 |
| WO | 2020/139050 | 7/2020 |
| WO | 2020/0143709 | 7/2020 |

OTHER PUBLICATIONS

Office Action for corresponding JP Patent Appl. No. 2023-507623, dated Feb. 14, 2024, 10 pages with unofficial translation.

Office Action for corresponding JP Patent Appl. No. 2023-507623, dated May 22, 2024, 7 pages with unofficial translation.

European Extended Search Report for corresponding EP Patent Appl. No. 20948423.7, dated Jun. 21, 2023, 7 pages.

Office Action for corresponding CN Patent Appl. No. 202080103986.9, dated Jul. 15, 2024, 24 pages with unofficial translation.

Huawei "Introduction of EN-DC into 36.212" 3GPP TSG-RAN WG1 Meeting #92 R1-1803183, Athens, Greece, Feb. 26-Mar. 2, 2018, 52 pages.

International Search Report and Written Opinion for PCT/CN2020/107653, filed Aug. 7, 2020, 6 pages.

Decision to Grant for corresponding CN Patent Appl. No. 202080103986.9, dated Nov. 20, 2024, 10 pages with google machine translation.

Vivo "Discussion on mode 1 resource allocation mechanism" 3GPP TSG RAN WG1 Meeting #99 R1-1912021, Reno, USA, Nov. 18-22, 2019, 18 pages.

3GPP "Technical Specification Group Radio Access Network" 3GPP TS 38.213 V15.5.0 (Mar. 2019), 104 pages.

Office Action for Taiwanese application No. 110112980, mail date: Jan. 8, 2025, 40 pages with Google translation.

Notice of Allowance for corresponding Japanese Patent Application No. 2023-507623, dated Oct. 15, 2024, 5 pages with machine English translation.

JPO, Decision to Grant for Japanese Application No. 2024-160946, mailed on May 29, 2025, 4 pages with unofficial English translation.

* cited by examiner

CODEBOOK DESIGN FOR MULTIMEDIA BROADCAST MULTICAST SERVICES (MBMS)

CROSS-REFERENCE TO RELATED APPLICATION

This application is a continuation and claims priority to International Application No. PCT/CN2020/107653, filed on Aug. 7, 2020, the disclosure of which is hereby incorporated by reference herein in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to determining PUCCH resources for a HARQ-ACK codebook of a MBMS service.

In one exemplary aspect, a method for wireless communication is disclosed. The method includes receiving, by a terminal, a first set of information relating to a unicast service and a second set of information relating to a multimedia broadcast multicast service (MBMS). The method also includes generating, by the terminal, a final codebook that is a concatenation of a first codebook based on the first set of information and a second codebook based on the second set of information.

In another exemplary aspect, a method for wireless communication is disclosed. The method includes transmitting, by a network node, a first set of information relating to a unicast service and a second set of information relating to a multimedia broadcast multicast service (MBMS) to a terminal. The method also includes receiving, by the network node, a second message from the terminal, wherein the second message is based on a final codebook generated by the terminal, the final codebook being a concatenation of a first codebook based on the first set of information and a second codebook based on the second set of information.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the clauses.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

For UEs that receive Multimedia Broadcast Multicast Service (MBMS) services, in order to improve the reliability of reception, Hybrid automatic repeat request acknowledgement (HARQ-ACK) feedback is proposed for MBMS services in 5G networks.

For an MBMS service, which is received by multiple UEs at the same time, UE feedback can be used to construct the HARQ-ACK codebook in multiple ways. In some cases, a UE may receive unicast services and MBMS services at the same time. In these cases, it may be undetermined how the UE is to construct the HARQ-ACK codebook. Further, it may be undetermined how the UE determines the uplink control channel resources used by the HARQ-ACK codebook containing the HARQ-ACK of the MBMS service. Particularly, it may be undetermined when the HARQ-ACK of the unicast service and the multicast service are multiplexed in one HARQ-ACK codebook.

The present embodiments relate to determining PUCCH resources for a HARQ-ACK codebook of a MBMS service. The present embodiments may provide a flexible solution for determining the PUCCH resources for a HARQ-ACK codebook of a MBMS service.

Figure 1:
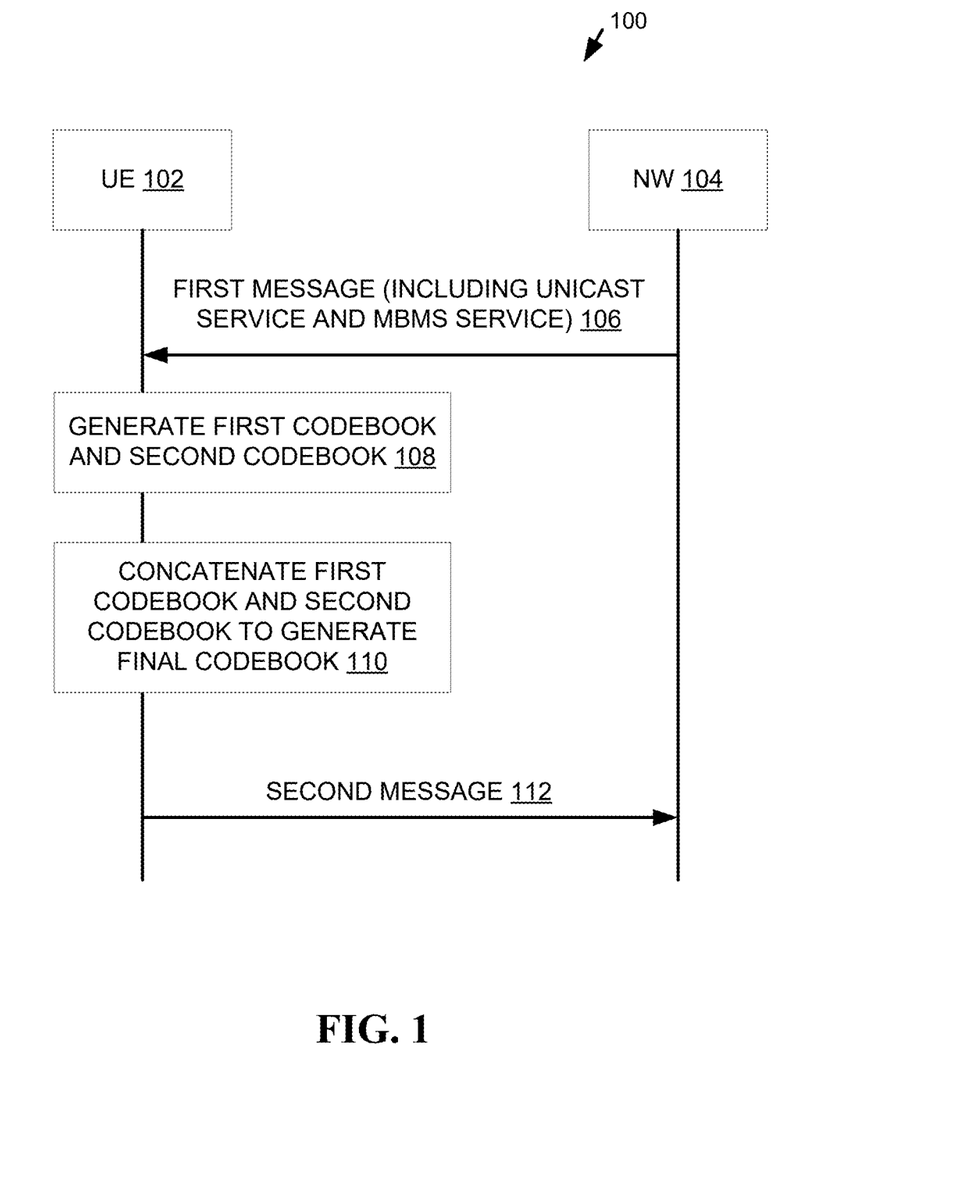
FIG. 1 is an example signaling process for generation of a final codebook based on unicast service and MBMS service information.

FIG. 1 is an example signaling process 100 for generation of a final codebook based on unicast service and MBMS service information. In step 106, a network node (e.g., NW 104) can send a first message that includes unicast service information and MBMS service information to a UE 102.

In step 108, the UE 102 can generate a first codebook based on the unicast service information and a second codebook based on the MBMS service information.

In step 110, the UE can concatenate the first codebook and the second codebook to generate a final codebook. The final codebook can be a HARQ-ACK codebook and can be transmitted in a PUCCH resource determined based on this HARQ-ACK codebook as described herein.

In step 112, the UE 102 can send a second message to the NW 104. The second message can be based on the final codebook as described herein.

Figure 2:
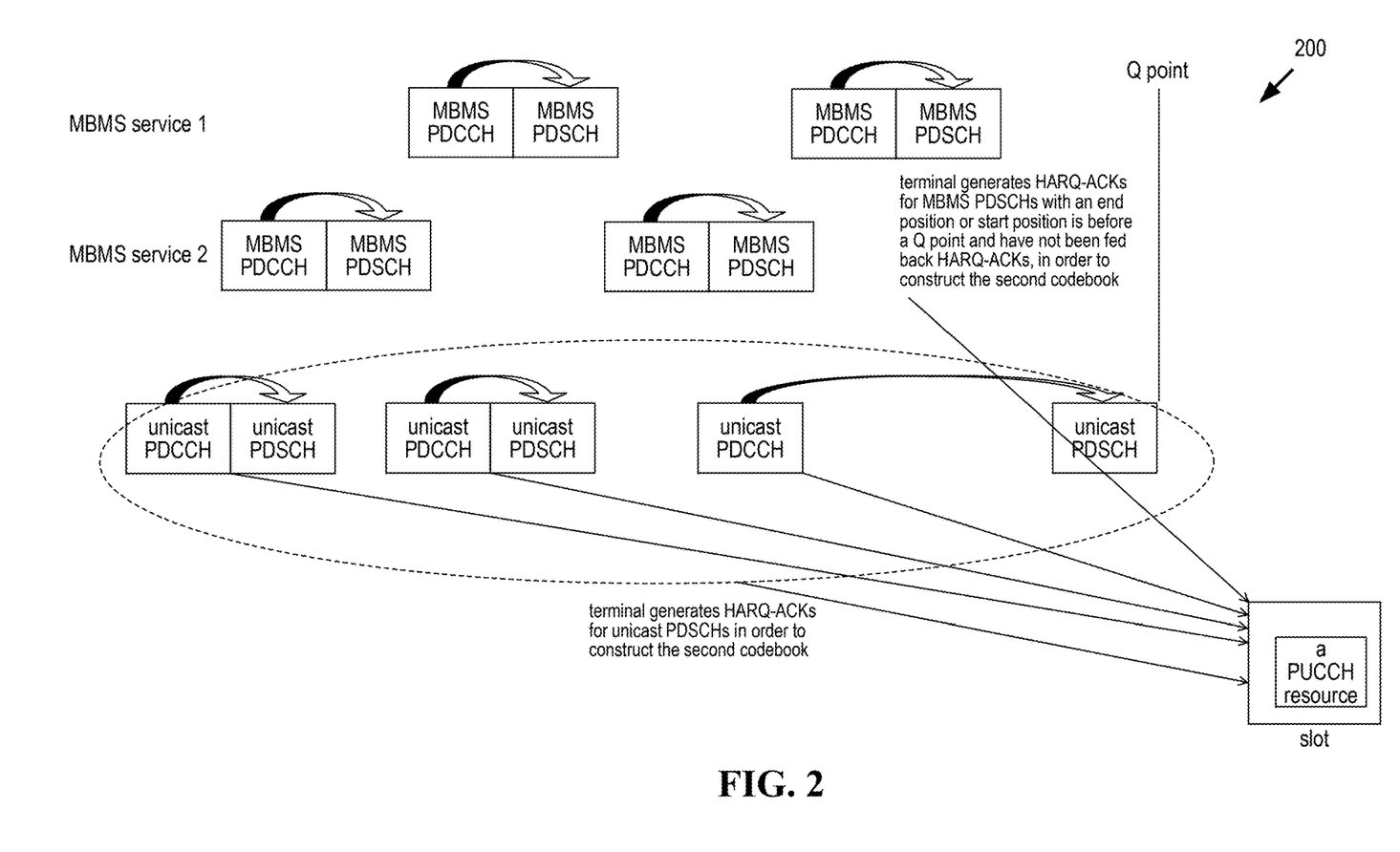
FIG. 2 is a block diagram illustrating multiple sets of MBMS service information.

FIG. 2 is a block diagram 200 illustrating multiple sets of MBMS service information.

Example Embodiment 1

In many cases, for the unicast service, the UE can construct the HARQ-ACK codebook. The codebook can be constructed according to the DAI value in the PDCCH for scheduling the unicast PDSCH.

Further, in many cases, the parameter k1 in a PDCCH can indicate the slot position of the HARQ-ACK corresponding to the PDSCH scheduled by the PDCCH. If the HARQ-ACKs of PDSCHs scheduled by multiple PDCCHs are indicated to the same slot for transmission. The HARQ-ACKs can be constructed in a HARQ-ACK codebook according to the DAI value. A PUCCH resource can be determined for this HARQ-ACK codebook through the PRI in the last PDCCH (in the time-frequency domain) in the PDCCHs corresponding to this HARQ-ACK codebook.

The MBMS service as described herein can refer to the MBMS service to provide HARQ-ACK feedback. In example embodiment 1, the unicast service can refer to a dynamically scheduled PDSCH, that is, DG PDSCH.

Particularly, example embodiment 1 can include the UE simultaneously receiving the unicast service and the MBMS service. For the received unicast service, the UE can construct a sub-HARQ-ACK codebook according to a codebook, denoted as sub-codebook 1. For the received MBMS service, the UE can construct a sub-HARQ-ACK codebook, denoted as sub-codebook 2. Then, sub-codebook 1 and sub-codebook 2 can be concatenated to obtain a final HARQ-ACK codebook.

The structure of sub-codebook 2 can include one of the following options. As a first option, for an MBMS service, a HARQ-ACK codebook can be constructed according to the period of the MBMS service configuration. For example, a G-RNTI is associated with an MBMS service, that is, when a PDCCH schedules an MBMS service (e.g., MBMS PDSCH). This PDCCH can be scrambled by the G-RNTI corresponding to the MBMS service.

For example, one transmission period is configured for one MBMS service, and one HARQ-ACK message is generated for each transmission period, regardless of whether the MBMS service is actually transmitted in this transmission period. In the case of receiving multiple MBMS services at the same time, sub-codebooks can be constructed for each MBMS service according to the transmission period, and then these sub-codebooks are concatenated to form sub-codebook 2. The concatenation sequence may be one of the following: the sequence of MBMS service index, the sequence of G-RNTI, and/or the sequence of MBMS logical channel index.

As a second option, a DAI counter can be respectively associated with each MBMS service. For example, when an MBMS service is transmitted, the DAI counter in the PDCCH of the MBMS service can be used as the scheduled MBMS PDSCH.

If the UE receives multiple MBMS services at the same time, the ULE can use the DAI counter of each service to construct a sub-codebook for each MBMS service, respectively. Then, these sub-codebooks can be concatenated to form sub-codebook 2. The concatenation sequence may be one of the following: the sequence of MBMS service index, the sequence of G-RNTI, and/or the sequence of MBMS logical channel index.

Sub-codebook 1 and sub-codebook 2 can be concatenated to obtain the final HARQ-ACK codebook. Sub-codebook 2 can be concatenated after sub-codebook 1, and vice versa.

A PUCCH resource can be determined as a formed HARQ-ACK codebook. A first solution can include the PDCCH of the unicast service is used to determine the PUCCH resource for the final HARQ-ACK codebook containing the HARQ-ACK of the MBMS service. In this way, high flexibility can be obtained in determining PUCCH resources.

The sub-codebook 1 of the unicast service can be constructed independently. At least for the MBMS PDSCHs with an end position or start position that are before the Q point, the UE can construct the sub-codebook 2 for them according to the above options. Then, the UE can concatenate sub-codebook 1 and sub-codebook 2 to obtain the final HARQ-ACK codebook. The PUCCH resource for the final HARQ-ACK codebook can be determined to be the last PDCCH in the time-frequency domain in the PDCCHs corresponding to the sub-codebook 1.

In some embodiments, the sub-codebook 1 of the unicast service can be independently constructed. At least for the MBMS PDSCHs with an end position or start position that are before Q point and that have not been fed back HARQ-ACKs, the UE can construct sub-codebook 2 for them according to the options above. Then, the UE can concatenate sub-codebook 1 and sub-codebook 2 to obtain the final HARQ-ACK codebook. The PUCCH resource for the final HARQ-ACK codebook can be determined to be the last PDCCH in the time-frequency domain in the PDCCHs corresponding to the sub-codebook 1.

In some embodiments, sub-codebook 1 of the unicast service is independently constructed. At least for the MBMS PDSCHs (scheduled by the PDCCH of the MBMS service) with an end position or start position that are no later than Q point, the UE can construct the sub-codebook 2 for them according to the above options. Then, the UE can concatenate sub-codebook 1 and sub-codebook 2 to obtain the final HARQ-ACK codebook. The PUCCH resource for the final HARQ-ACK codebook can be determined to be the last PDCCH in the PDCCHs in the time-frequency domain corresponding to the sub-codebook 1.

In some embodiments, sub-codebook 1 of the unicast service is independently constructed. At least for MBMS PDSCHs with an end position or start position that are no later than a Q point and that have not been fed back HARQ-ACKs, the UE can construct sub-codebook 2 for them according to the above options. Then the UE can concatenate sub-codebook 1 and sub-codebook 2 to obtain the final HARQ-ACK codebook. The PUCCH resource for the final HARQ-ACK codebook can be determined to be the last PDCCH (in the time-frequency domain) in the PDCCHs corresponding to the sub-codebook 1.

The definition of Q point can include one of the following:
1) In the time domain, the starting position of the last PDCCH in the PDCCHs corresponding to sub-codebook 1.
2) In the time domain, the end position of the last PDCCH in the PDCCHs corresponding to sub-codebook 1.

3) In the time domain, the starting position of the last PDSCH in the PDSCHs corresponding to sub-codebook 1.
4) In the time domain, the end position of the last PDSCH in the PDSCHs corresponding to sub-codebook 1.

In some embodiments, for a HARQ-ACK codebook, if it contains HARQ-ACK for unicast services and HARQ-ACK for multicast services, the UE can determine a PUCCH resource for the HARQ-ACK codebook according to the PRI in the last PDCCH (in the time-frequency domain) in the PDCCHs corresponding to the HARQ-ACKs of the unicast service in the HARQ-ACK codebook.

When constructing a HARQ-ACK codebook that includes HARQ-ACK for unicast services and HARQ-ACK for MBMS services, k1 or PRI in the PDCCH of unicast services can be always valid, and the k1 or PRI in the PDCCH of the multicast service can always be invalid when generating the final codebook that includes the first codebook and the second codebook. Alternatively, the k1 or PRI in the PDCCH of the unicast service may always overwrite the k1 or PRI in the PDCCH of the multicast service when generating the final codebook that includes the first codebook and the second codebook.

Determining a PUCCH resource according to the last PDCCH (in the time-frequency domain) corresponding to sub-codebook 1 may be an existing technology. First, this can include confirming that the last monitoring occasion (MO) is in the time domain according to the MO time sequence; if there are multiple carriers in the last MO, then the last carrier in the frequency domain can be determined according to the carrier index (from small to large). If there are multiple PDCCHs corresponding to the last carrier in the last MO, the last PDCCH can be determined according to the start time sequence of the PDSCHs corresponding to the multiple PDCCHs.

Here, the MBMS PDSCH scheduled by the PDCCH of the MBMS service may also have no corresponding PDCCH. That is, the MBMS PDSCH may be semi-statically transmitted without the corresponding PDCCH.

The last PDCCH used to determine the PUCCH resource may be the last PDCCH of the unicast service sub-codebook 1, which may not be the last PDCCH corresponding to the final HARQ-ACK codebook.

In many cases, there may be no unicast service HARQ-ACK and the MBMS service HARQ-ACK are multiplexed in one HARQ-ACK codebook. In many cases, the PUCCH resource of the HARQ-ACK codebook can be determined according to the PRI in the last PDCCH (in the time-frequency domain) in the PDCCHs corresponding to the HARQ-ACK codebook.

In this embodiment, the PUCCH resource can be based on PRI in the last PDCCH (in the time-frequency domain) in the PDCCHs corresponding to the HARQ-ACK of the unicast service in the HARQ-ACK codebook containing the HARQ-ACK of the unicast service and the HARQ-ACK of the MBMS service.

If the PUCCH resource of the HARQ-ACK codebook is determined to be based on the last PDCCH and this last PDCCH is the PDCCH of the MBMS service, this can cause all UEs receiving the MBMS service to use the same PRI value to determine their PUCCH resources. This method can greatly reduce the flexibility of determining PUCCH resources and increase the complexity of configuring PUCCH resources by the base station. By adopting the method of this application, it can be avoided that the last PDCCH is a PDDCH of an MBMS service.

Example Embodiment 2

In example embodiment 2, the UE can simultaneously receive unicast service and MBMS service. However, the unicast service here can refer to the semi-static transmission PDSCH, namely SPS PDSCH.

For the received unicast service, the UE can construct the HARQ-ACK codebook, denoted as sub-codebook 3. For the received MBMS service, the UE can independently construct a HARQ-ACK codebook, denoted as sub-codebook 2. Then, sub-codebook 3 and sub-codebook 2 can be concatenated to construct the final HARQ-ACK codebook.

The structure of the sub-codebook 2 can be the same as that of the Embodiment 1. Sub-codebook 3 and sub-codebook 2 can be concatenated to obtain the final HARQ-ACK codebook. The sub-codebook 2 can be concatenated after the sub-codebook 3, and vice versa.

A PUCCH resource can be determined as a formed HARQ-ACK codebook using multiple solutions. A solution can include, for a HARQ-ACK codebook where the HARQ-ACK of the unicast service and the HQARQ-ACK of the MBMS service are mixed, the PUCCH resource can be determined to be a PUCCH resource corresponding to the last PDSCH (in the time domain) in the PDSCHs of the unicast service in the HARQ-ACK codebook. In this way, it can be highly flexible to determine the PUCCH resource as the HARQ-ACK codebook.

The sub-codebook 3 of the unicast service can be constructed independently. At least for MBMS PDSCHs with an end position or start position that are before the T point, the UE can construct the sub-codebook 2 according to the above options. Then the UE can concatenate sub-codebook 3 and sub-codebook 2 to obtain the final HARQ-ACK codebook. The PUCCH resource for the final HARQ-ACK codebook can be determined to be the PUCCH resource determined by the sub-codebook 3.

Sub-codebook 3 can include a HARQ-ACK codebook that only includes HARQ-ACK of SPS PDSCH.

A second solution can also be described as: the sub-codebook 3 of the unicast service can be independently constructed. At least for MBMS PDSCHs with an end position or start position that are before T point and that have not been fed back HARQ-ACKs, UE can construct sub-codebook 2 according to the options above. Then, the UE can concatenate sub-codebook 3 and sub-codebook 2 to obtain the final HARQ-ACK codebook. The PUCCH resource for the final HARQ-ACK codebook can be determined to be the PUCCH resource determined by the sub-codebook 3.

The second solution can also include the sub-codebook 3 of the unicast service being independently constructed. At least for the MBMS PDSCHs with an end position or start position that are no later than T point, the UE can construct the sub-codebook 2 for them according to the above options. Then, the UE can concatenate sub-codebook 3 and sub-codebook 2 to obtain the final HARQ-ACK codebook. The PUCCH resource for the final HARQ-ACK codebook can be determined to be the PUCCH resource determined by the sub-codebook 3.

The second solution can also include sub-codebook 3 of the unicast service being independently constructed. At least for MBMS PDSCHs with an end position or start position that are no later than T point and that have not been fed back HARQ-ACK, the UE can construct sub-codebook 2 according to the above options. Then, the UE can concatenate sub-codebook 3 and sub-codebook 2 to obtain the final HARQ-ACK codebook. The PUCCH resource for the final HARQ-ACK codebook can be determined to be the PUCCH resource determined by the sub-codebook 3.

Here, the definition of point T can include one of the following:
1) In the SPS PDSCHs corresponding to sub-codebook 3, the starting position of the last SPS PDSCH in the time domain.
2) In the SPS PDSCHs corresponding to sub-codebook 3, the end position of the last SPS PDSCH in the time domain.

The second solution can also include, for a HARQ-ACK codebook containing HARQ-ACK for unicast services and HARQ-ACK for MBMS services, the base station and UE can consider the PUCCH resource for this HARQ-ACK codebook being determined to be the PUCCH resource corresponding to the last SPS PDSCH in the SPS PDSCHs corresponding to the HARQ-ACKs of the unicast service.

The second solution can also include, when constructing a HARQ-ACK codebook that includes HARQ-ACK for unicast services and HARQ-ACK for MBMS services, k1 or PRI in the activated PDCCH corresponding to a SPS PDSCH of unicast services can always be valid, and the k1 or PRI in the PDCCH of the multicast service can always be invalid when generating the final codebook that includes the first codebook and the second codebook.

Here, the MBMS PDSCH scheduled by the PDCCH of the MBMS service may also have no corresponding PDCCH, that is, the MBMS PDSCH is semi-statically transmitted without the corresponding PDCCH.

Example Embodiment 3

A third example embodiment can solve how to determine that a PUCCH resource is for a HARQ-ACK codebook with only the HARQ-ACK of the MBMS service.

In a solution for the third example embodiment, the UE can always use the options mentioned in the above-mentioned example embodiment 1 to construct this HARQ-ACK codebook. For example, if one or more MBMS PDSCHs of MBMS services are indicated by corresponding PDCCHs to the same slot in order to transmit HARQ-ACKs of MBMS services, then HARQ-ACKs of these MBMS PDSCHs can be constructed in one HARQ-ACK codebook. The UE can use the options listed above to construct a HARQ-ACK codebook for the one or more MBMS services. The PRI in the last MBMS PDCCH corresponding to this HARQ-ACK codebook can be used to determine the PUCCH resource for this HARQ-ACK codebook.

Example Embodiment 4

If a HARQ-ACK codebook contains multiple of sub-codebooks 1, 2 or 3 in the above embodiments 1 and 2, then the UE can concatenate these sub-codebooks as follows: sub-codebook 1, sub-codebook 3, Sub-codebook 2, so that the base station and UE can understand the same. Other cascade sequences can also be possible.

Here, the sub-codebook 1 can be independently constructed according to the prior art, and the sub-codebook 3 can also be independently constructed according to the prior art.

Here, for a HARQ-ACK codebook containing at least sub-codebook 1, the base station and UE can always consider that: a PUCCH resource for this HARQ-ACK codebook is determined based on the PRI in the last PDCCH (in the time-frequency domain) in the PDCCHs corresponding to sub-codebook 1.

Example Embodiment 5

In example embodiment 5, other methods can be provided to solve the problems mentioned in the background art. As a fourth solution, for a HARQ-ACK codebook, including the HARQ-ACK of the MBMS service, the base station can always ensure that the last PDCCH in the PDCCHs corresponding to this HARQ-ACK codebook is the PDCCH of the unicast service, and use the PDCCH of the unicast service to determine the slot and PUCCH resources for the HARQ-ACK codebook.

Even when the base station has no downlink data transmission, the base station can transmit a PDCCH to schedule a "false" unicast PDSCH for the UE and make this PDCCH to be the last PDCCH in the PDCCHs corresponding to this HARQ-ACK codebook including the HARQ-ACK of the MBMS service.

The UE can receive this PDCCH, and receive the "false" PDSCH, and feed back HARQ-ACK (because it is a "false" PDSCH, the UE cannot decode correctly, the UE feeds back NACK, and the base station will not retransmit this "false" PDSCH).

A fifth solution can include introducing a new downlink DCI format, or set a new parameter field in the existing DCI format to notify the ULE that an untransmitted HARQ-ACK codebook can be transmitted in the slot and PUCCH resource indicated by this DCI. The original slot position and PUCCH resource for this untransmitted HARQ-ACK codebook can be discarded.

For example, the base station and the UE agree that after receiving the above DCI, the UE will determine a PUCCH resource according to the slot position and PRI indicated in the DCI in order to transmit an untransmitted HARQ-ACK codebook.

In other words, the base station can always adjust the slot position and PUCCH resource for a HARQ-ACK codebook by sending this kind of DCI.

Figure 3:
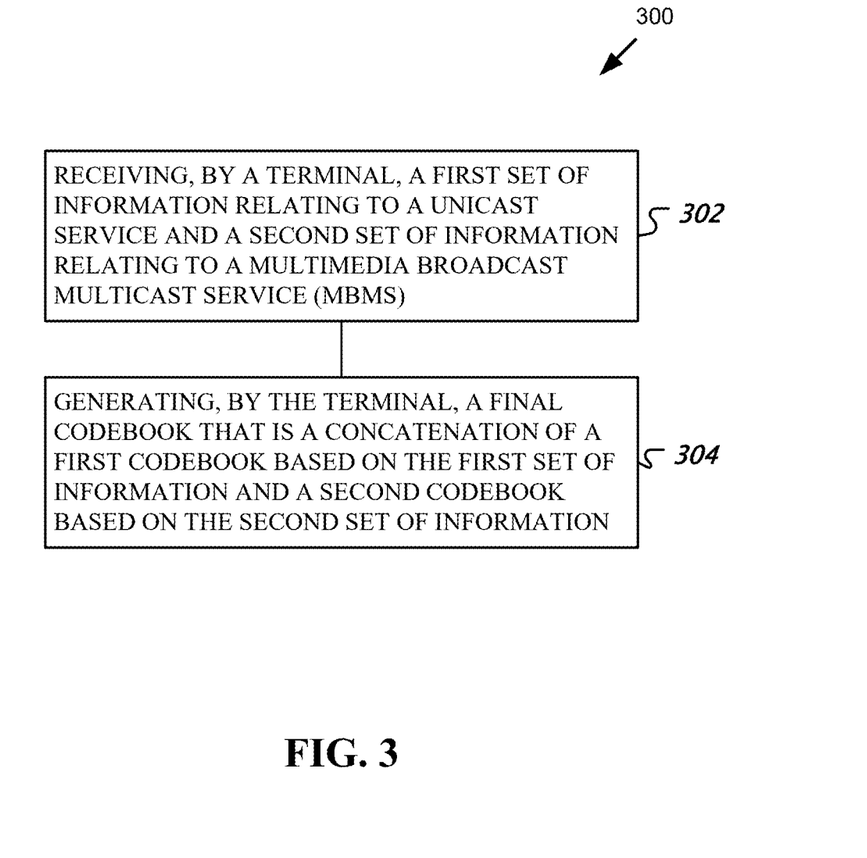
FIG. 3 is a block diagram of a first example method for generating a final codebook based on unicast service information and MBMS service information.

FIG. 3 is a block diagram of a first example method 300 for generating a final codebook based on unicast service information and MBMS service information. The method can include receiving, by a terminal, a first set of information relating to a unicast service and a second set of information relating to a multimedia broadcast multicast service (MBMS) (block 302). The first set of information and the second set of information can be provided to the UE via a first message 106 as described with respect to FIG. 1, for example.

The method can also include generating, by the terminal, a final codebook that is a concatenation of a first codebook based on the first set of information and a second codebook based on the second set of information (block 304). The final codebook (e.g., final codebook generated in step 110 of FIG. 1) can include a HARQ-ACK codebook and can be transmitted in a PUCCH resource determined based on this HARQ-ACK codebook.

In some embodiments, the first set of information relating to the unicast service includes a downlink grant (DL) Physical Downlink Shared Channel (PDSCH).

In some embodiments, the first codebook and the second codebook comprise sub hybrid automatic repeat request (HARQ) acknowledgement (sub-harq-ack) codebooks.

In some embodiments, the final codebook is a HARQ-ACK codebook.

In some embodiments, the second codebook is derived based on a period of a multimedia broadcast multicast service (MBMS) configuration.

In some embodiments, the second set of information includes information relating to multiple MBMS services, and wherein the terminal respectively constructs a codebook for each MBMS service included in the multiple MBMS services based on a period of each MBMS configuration, and wherein each codebook for each MBMS service is concatenated by the terminal to derive the second codebook.

In some embodiments, the second codebook is derived based on a downlink assignment index (DAI) counter associated with each MBMS service separately included in the second set of information.

In some embodiments, the second set of information includes information relating to multiple MBMS services, and wherein the terminal constructs a codebook for each MBMS service according to a DAI counter corresponding to each MBMS service included in the multiple MBMS services, and wherein each codebook for each MBMS service is concatenated by the terminal to derive the second codebook.

In some embodiments, a sequence for concatenating each codebook for each MBMS service includes any of: a sequence of a MBMS service index, a sequence of a group radio network temporary identifier (G-RNTI), and a sequence of a MBMS logical channel index.

In some embodiments, the method includes determining, by the terminal, a physical uplink control channel (PUCCH) resource for the final codebook.

In some embodiments, the terminal uses a physical downlink control channel (PDCCH) of the unicast service included in the first set of information to determine the PUCCH resource.

In some embodiments, the terminal generates HARQ-ACKs for MBMS PDSCHs with an end position or start position that are before a Q point, in order to construct the second codebook.

In some embodiments, the terminal generates HARQ-ACKs for MBMS PDSCHs with an end position or start position that are before a Q point and that have not been fed back HARQ-ACKs, in order to construct the second codebook.

In some embodiments, the terminal generates HARQ-ACKs for MBMS PDSCHs with an end position or start position that are no later than a Q point, in order to construct the second codebook.

In some embodiments, the terminal generates HARQ-ACKs for MBMS PDSCHs with an end position or start position that are no later than a Q point and that have not been fed back HARQ-ACKs, in order to construct the second codebook.

In some embodiments, the Q point includes any of: a starting position of a last PDCCH in the PDCCHs corresponding to the first codebook in the time domain, an end position of the last PDCCH in the PDCCHs corresponding to the first codebook in the time domain, a starting position of a last PDSCH in the PDSCHs corresponding to the first codebook in the time domain, and an end position of the last PDSCH in the PDSCHs corresponding to the first codebook in the time domain.

In some embodiments, the PUCCH resource is determined based on a last PDCCH corresponding to the first codebook in the final codebook.

In some embodiments, the terminal determines the PUCCH resource according to a PUCCH resource indicator (PRI) in a last PDCCH that corresponds to HARQ-ACKs of the unicast service in the final codebook.

In some embodiments, a first k1 and/or a first PRI parameter in a PDCCH of the unicast service is valid and a second k1 and/or a second PRI parameter in a PDCCH of the MBMS service is invalid when generating the final codebook that includes the first codebook and the second codebook.

In some embodiments, the first k1 and/or the first PRI parameters in the PDCCH of the unicast service overwrite the second k1 and/or the second PRI parameter in the PDCCH of the multicast broadcast service when generating the final codebook that includes the first codebook and the second codebook.

In some embodiments, the PUCCH resource is determined based on identifying a last PDCCH corresponding to the first codebook according to a start time sequence of a series of unicast physical downlink shared channel (PDSCH) resources corresponding to multiple unicast PDCCH associated with a last carrier in a last monitoring occasion (MO).

In some embodiments, the MBMS service is at least one of: a dynamically scheduled MBMS PDSCH with PDCCH and a semi-statically configured MBMS PDSCH without PDCCH.

In some embodiments, the unicast service comprises a semi-persistent scheduling (SPS) physical downlink shared channel (PDSCH).

In some embodiments, a PUCCH resource for the final codebook is determined to be a PUCCH resource corresponding to a last PDSCH in a unicast PDSCHs corresponding to the first codebook in the final codebook.

In some embodiments, the terminal generates HARQ-ACKs for MBMS PDSCHs with an end position or start position that are before a T point, in order to construct the second codebook.

In some embodiments, the terminal generates HARQ-ACKs for MBMS PDSCHs with an end position or start position that are before a T point and that have not been fed back HARQ-ACKs, in order to construct the second codebook.

In some embodiments, the terminal generates HARQ-ACKs for MBMS PDSCHs with an end position or start position that are no later than a T point, in order to construct the second codebook.

In some embodiments, the terminal generates HARQ-ACKs for MBMS PDSCHs with an end position or start position that are no later than a T point and that have not been fed back HARQ-ACKs, in order to construct the second codebook.

In some embodiments, the T point includes any of: a starting position of a last SPS PDSCH in SPS PDSCHs corresponding to the first codebook in a time domain, and an end position of the last SPS PDSCH in SPS PDSCHs corresponding to the first codebook in the time domain.

In some embodiments, a first K1 and/or a first PRI parameter in an activated PDCCH corresponding to a SPS PDSCH of the unicast service is valid and a second K1 and/or a second PRI parameter in a PDCCH of the MBMS service is invalid when generating the final codebook that includes the first codebook and the second codebook.

In some embodiments, MBMS service is at least one of: dynamically scheduled MBMS PDSCH with PDCCH and semi-statically configured MBMS PDSCH without PDCCH.

Figure 4:
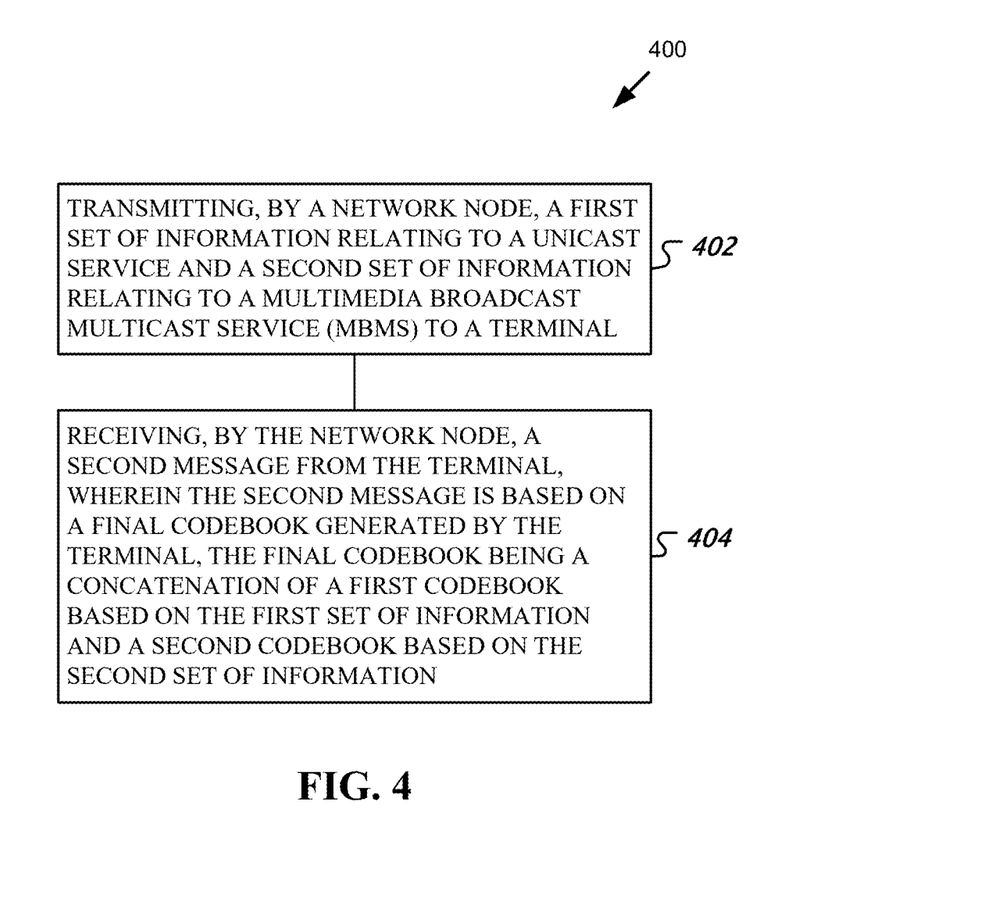
FIG. 4 is a block diagram of a second example method for generating a final codebook based on unicast service information and MBMS service information.

FIG. 4 is a block diagram of a second example method 300 for generating a final codebook based on unicast service information and MBMS service information. The method can include transmitting, by a network node, a first set of information relating to a unicast service and a second set of information relating to a multimedia broadcast multicast service (MBMS) to a terminal (block 402). The first set of information and the second set of information can be transmitted via a first message 106 as described with respect to FIG. 1.

The method can also include receiving, by the network node, a second message from the terminal, wherein the second message is based on a final codebook generated by the terminal, the final codebook being a concatenation of a first codebook based on the first set of information and a second codebook based on the second set of information (block 404). The second message can include second message 112 as described with respect to FIG. 1.

In some embodiments, the first set of information relating to the unicast service includes a downlink grant (DL) Physical Downlink Shared Channel (PDSCH).

In some embodiments, the first codebook and the second codebook comprise sub hybrid automatic repeat request (HARQ) acknowledgement (sub-harq-ack) codebooks.

In some embodiments, the final codebook is a HARQ-ACK codebook.

In some embodiments, the second set of information includes information relating to multiple MBMS services, and wherein the terminal respectively constructs a codebook for each MBMS service included in the multiple MBMS services based on a period of each MBMS configuration, and wherein each codebook for each MBMS service is concatenated by the terminal to derive the second codebook.

In some embodiments, the second set of information includes information relating to multiple MBMS services, and wherein the terminal constructs a codebook for each MBMS service according to a DAI counter corresponding to each MBMS service included in the multiple MBMS services, and wherein each codebook for each MBMS service is concatenated by the terminal to derive the second codebook.

In some embodiments, the unicast service comprises a semi-persistent scheduling (SPS) physical downlink shared channel (PDSCH).

Example Wireless System

Figure 5:
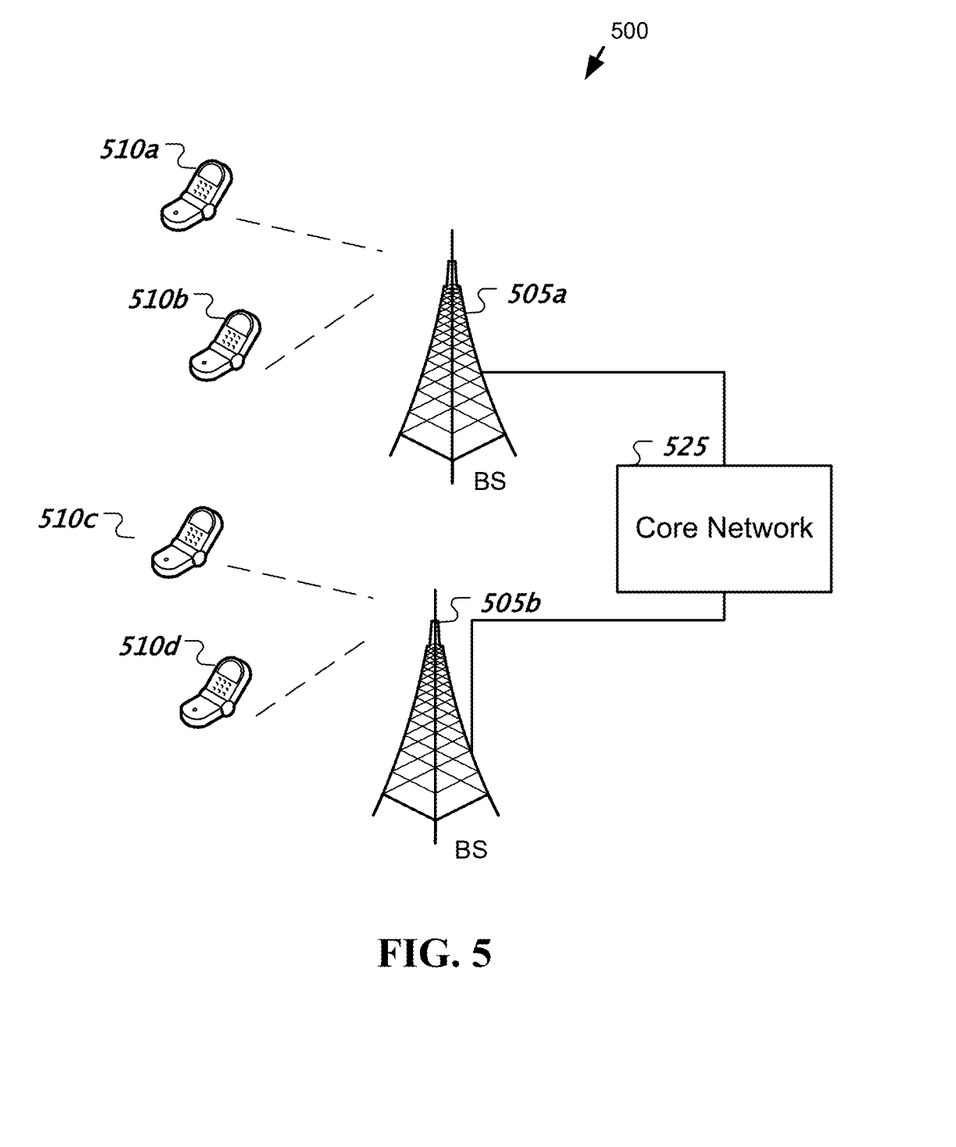
FIG. 5 shows an example of a wireless communication system where techniques in accordance with one or more embodiments of the present technology can be applied.

FIG. 5 shows an example of a wireless communication system where techniques in accordance with one or more embodiments of the present technology can be applied. A wireless communication system 500 can include one or more base stations (BSs) 505*a*, 505*b*, one or more wireless devices or terminals 510*a*, 510*b*, 510*c*, 510*d*, and a core network 525. A base station 505*a*, 505*b* can provide wireless service to wireless devices 510*a*, 510*b*, 510*c* and 510*d* in one or more wireless sectors. In some implementations, a base station 505*a*, 505*b* includes directional antennas to produce two or more directional beams to provide wireless coverage in different sectors. The base station may implement functionalities of a scheduling cell or a candidate cell, as described in the present document.

The core network 525 can communicate with one or more base stations 505*a*, 505*b*. The core network 525 provides connectivity with other wireless communication systems and wired communication systems. The core network may include one or more service subscription databases to store information related to the subscribed wireless devices 510*a*, 510*b*, 510*c*, and 510*d*. A first base station 505*a* can provide wireless service based on a first radio access technology, whereas a second base station 505*b* can provide wireless service based on a second radio access technology. The base stations 505*a* and 505*b* may be co-located or may be separately installed in the field according to the deployment scenario. The wireless devices 510*a*, 510*b*, 510*c*, and 510*d* can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 6:
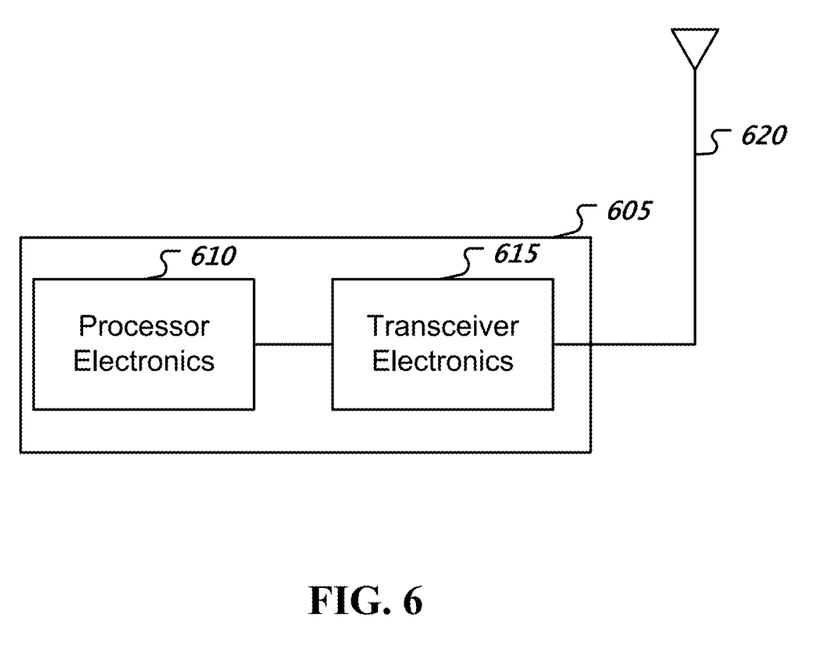
FIG. 6 is a block diagram representation of a portion of a hardware platform.

FIG. 6 is a block diagram representation of a portion of a hardware platform. A hardware platform 605 such as a network node or a base station or a terminal or a wireless device (or UE) can include processor electronics 610 such as a microprocessor that implements one or more of the techniques presented in this document. The hardware platform 605 can include transceiver electronics 615 to send and/or receive wired or wireless signals over one or more communication interfaces such as antenna 620 or a wireline interface. The hardware platform 605 can implement other communication interfaces with defined protocols for transmitting and receiving data. The hardware platform 605 can include one or more memories (not explicitly shown) configured to store information such as data and/or instructions. In some implementations, the processor electronics 610 can include at least a portion of the transceiver electronics 615. In some embodiments, at least some of the disclosed techniques, modules or functions are implemented using the hardware platform 605.

CONCLUSION

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   receiving, by a terminal from a base station, a first set of information relating to a unicast service and a second set of information relating to a plurality of multicast services, wherein each of the plurality of multicast services is associated with a separate downlink assignment index (DAI);
   for each of the plurality of multicast services, constructing, by the terminal, a sub hybrid automatic repeat request (HARQ) acknowledgement (sub-HARQ-ACK) codebook based on a DAI corresponding to the each multicast service;
   generating, by the terminal, a final codebook by concatenating a first codebook followed by a set of second codebooks,
   wherein the first codebook is based on the first set of information,
   wherein the set of second codebooks comprises the plurality of sub-HARQ-ACK codebooks;
   wherein the plurality of sub-HARQ-ACK codebooks are concatenated in an order corresponding to a sequence of group radio network temporary identifier values, and
   wherein the final codebook comprises a HARQ-ACK codebook;
   determining, by the terminal, a physical uplink control channel (PUCCH) resource for the final codebook based on a last physical downlink control channel (PDCCH) of the unicast service, wherein the last PDCCH corresponds to the first codebook in the final codebook; and
   transmitting the final codebook to the base station by the terminal using the PUCCH resource.

2. The method of claim 1, wherein the first set of information relating to the unicast service includes a Physical Downlink Shared Channel (PDSCH) scheduled by downlink (DL) grant.

3. The method of claim 1, wherein the unicast service comprises a semi-persistent scheduling (SPS) physical downlink shared channel (PDSCH).

4. The method of claim 1, further comprising:
   in response to the first codebook comprising HARQ-ACK information corresponding to a semi-persistent scheduling (SPS) physical downlink shared channel (PDSCH), determining a physical uplink control channel (PUCCH) resource for the final codebook based on the SPS PDSCH.

5. The method of claim 1, wherein a first k1 parameter and a first physical uplink control channel (PUCCH) resource indicator (PRI) parameter in a physical downlink control channel (PDCCH) of the unicast service are valid, and a second k1 parameter and a second PRI parameter in a PDCCH of the multicast service are invalid when generating the final codebook.

6. A method for wireless communication, comprising:
   transmitting, by a base station to a terminal, a first set of information relating to a unicast service and a second set of information relating to a plurality of multicast services, wherein each of the plurality of multicast services is associated with a separate downlink assignment index (DAI); and
   receiving a final codebook from the terminal by the base station, wherein the final codebook is a concatenation of a first codebook based on the first set of information and a set of second codebooks based on the second set of information, wherein the set of second codebooks comprises a plurality of sub hybrid automatic repeat request (HARQ) acknowledgement (sub-HARQ-ACK) codebooks, wherein one of the plurality of sub-HARQ-ACK codebooks is constructed, by the terminal for each of the plurality of multicast services, based on the separate DAI associated with the each multicast service, wherein the final codebook comprises a HARQ-ACK codebook, and wherein the final codebook is generated by concatenating the first codebook followed by the set of second codebooks, wherein the plurality of sub-HARQ-ACK codebooks are concatenated in an order corresponding to a sequence of group radio network temporary identifier values, wherein the final codebook is transmitted by the terminal using a physical uplink control channel (PUCCH) resource determined based on a last physical downlink control channel (PDCCH) of the unicast service, and wherein the last PDCCH corresponds to the first codebook in the final codebook.

7. The method of claim 6, wherein the first set of information relating to the unicast service includes a Physical Downlink Shared Channel (PDSCH) scheduled by downlink (DL) grant.

8. The method of claim 6, wherein the unicast service comprises a semi-persistent scheduling (SPS) physical downlink shared channel (PDSCH).

9. The method of claim 6, wherein, in response to the first codebook comprising HARQ-ACK information corresponding to a semi-persistent scheduling (SPS) physical downlink shared channel (PDSCH), a physical uplink control channel (PUCCH) resource for the final codebook is determined based on the SPS PDSCH.

10. The method of claim 6, wherein a first k1 parameter and a first physical uplink control channel (PUCCH) resource indicator (PRI) parameter in a physical downlink control channel (PDCCH) of the unicast service are valid, and a second k1 parameter and a second PRI parameter in a PDCCH of the multicast service are invalid when the terminal generates the final codebook.

11. An apparatus implemented as a terminal for wireless communication, the apparatus comprising a processor that is configured to:
receive, by a terminal from a base station, a first set of information relating to a unicast service and a second set of information relating to a plurality of multicast services, wherein each of the plurality of multicast services is associated with a separate downlink assignment index (DAI);
for each of the plurality of multicast services, construct, by the terminal, a sub hybrid automatic repeat request (HARQ) acknowledgement (sub-HARQ-ACK) codebook based on a DAI corresponding to the each multicast service;
generate a final codebook by concatenating a first codebook followed by the set of second codebooks,
wherein the first codebook is based on the first set of information,
wherein the set of second codebooks comprises the plurality of sub-HARQ-ACK codebooks,
wherein the plurality of sub-HARQ-ACK codebooks are concatenated in an order corresponding to a sequence of group radio network temporary identifier values, wherein the final codebook comprises a HARQ-ACK codebook;
determine, by the terminal, a physical uplink control channel (PUCCH) resource for the final codebook based on a last physical downlink control channel (PDCCH) of the unicast service, wherein the last PDCCH corresponds to the first codebook in the final codebook; and
transmit the final codebook to the base station using the PUCCH resource.

12. The apparatus of claim 11, wherein a first k1 parameter and a first physical uplink control channel (PUCCH) resource indicator (PRI) parameter in a physical downlink control channel (PDCCH) of the unicast service are valid, and a second k1 parameter and a second PRI parameter in a PDCCH of the multicast service are invalid when generating the final codebook.

13. An apparatus implemented as a base station for wireless communication, the apparatus comprising a processor that is configured to:
transmit, to a terminal, a first set of information relating to a unicast service and a second set of information relating to a plurality of multicast services, wherein each of the plurality of multicast services is associated with a separate downlink assignment index (DAI); and
receive a final codebook from the terminal, wherein the final codebook is a concatenation of a first codebook based on the first set of information and a set of second codebooks based on the second set of information, wherein the set of second codebooks comprises a plurality of sub hybrid automatic repeat request (HARQ) acknowledgement (sub-HARQ-ACK) codebooks, wherein one of the plurality of sub-HARQ-ACK codebooks is constructed, by the terminal for each of the plurality of multicast services, based on the separate DAI associated with the each multicast service, wherein the final codebook comprises a HARQ-ACK codebook, and wherein the final codebook is generated by concatenating the first codebook followed by the set of second codebooks, wherein the plurality of sub-HARQ-ACK codebooks are concatenated in an order corresponding to a sequence of group radio network temporary identifier values, wherein the final codebook is transmitted by the terminal using a physical uplink control channel (PUCCH) resource determined based on a last physical downlink control channel (PDCCH) of the unicast service, and wherein the last PDCCH corresponds to the first codebook in the final codebook.

14. The apparatus of claim 13, wherein a first k1 parameter and a first physical uplink control channel (PUCCH) resource indicator (PRI) parameter in a physical downlink control channel (PDCCH) of the unicast service are valid, and a second k1 parameter and a second PRI parameter in a PDCCH of the multicast service are invalid when the terminal generates the final codebook.

* * * * *